United States Patent [19]

Peitz et al.

[11] Patent Number: 4,677,532

[45] Date of Patent: Jun. 30, 1987

[54] SCREENED VEHICULAR HEADLIGHT WITH AN ELLIPSOIDAL REFLECTOR

[75] Inventors: Wolfgang Peitz, Erwitte; Pietro-Antonio Mazziotti, Lippstadt, both of Fed. Rep. of Germany

[73] Assignee: Hella KG Hueck & Co., Lippstadt, Fed. Rep. of Germany

[21] Appl. No.: 884,478

[22] Filed: Jul. 11, 1986

[30] Foreign Application Priority Data

Aug. 17, 1985 [DE] Fed. Rep. of Germany ....... 3529546

[51] Int. Cl.[4] ........................... B60Q 1/00; B60Q 3/00

[52] U.S. Cl. ...................................... 362/61; 362/303; 362/305; 362/308; 362/328; 362/299

[58] Field of Search ................. 362/61, 255, 257, 296, 362/297, 298, 299, 303, 305, 308, 328

[56] References Cited

U.S. PATENT DOCUMENTS 1,159,419 11/1915 Roffy .................................. 362/299
1,260,439 3/1918 Otte ................................. 362/61 X
1,667,772 5/1928 Coon ................................ 362/61 X
2,078,986 5/1937 Young .............................. 362/61 X
2,154,842 4/1939 Glenn ............................... 362/61 X
2,165,305 7/1939 Ruths ............................. 362/299 X
3,598,989 8/1971 Biggs ............................... 362/61 X
3,796,886 3/1974 Freeman ........................ 362/303 X

*Primary Examiner*—Larry Jones
*Attorney, Agent, or Firm*—Max Fogiel

[57] ABSTRACT

A screened vehicular headlight with an ellipsoidal reflector has a source of light positioned in the reflector's first focal area. The headlight has a collecting lens positioned in the path of the rays behind the second focal area and accommodated in a rectangular area of a holder. A screen that produces a light-dark border is positioned between the collecting lens and the reflector and in the focal area of the lens. A transparent cover over the collecting lens has margins extending radially beyond the lens. The holder that accommodates the collecting lens has, above the horizontal midplane of the headlight, an upper marginal section that is bent toward the inside of the headlight and lateral marginal sections that extend out at an acute angle to the optical axis and extend far enough into the headlight to screen off not only the light that leaves bulb and directly strikes the marginal areas of the lens cover that extend radially beyond the collecting lens but also the view into the headlight through the marginal areas of the lens cover.

8 Claims, 4 Drawing Figures

SCREENED VEHICULAR HEADLIGHT WITH AN ELLIPSOIDAL REFLECTOR

Figure 1:
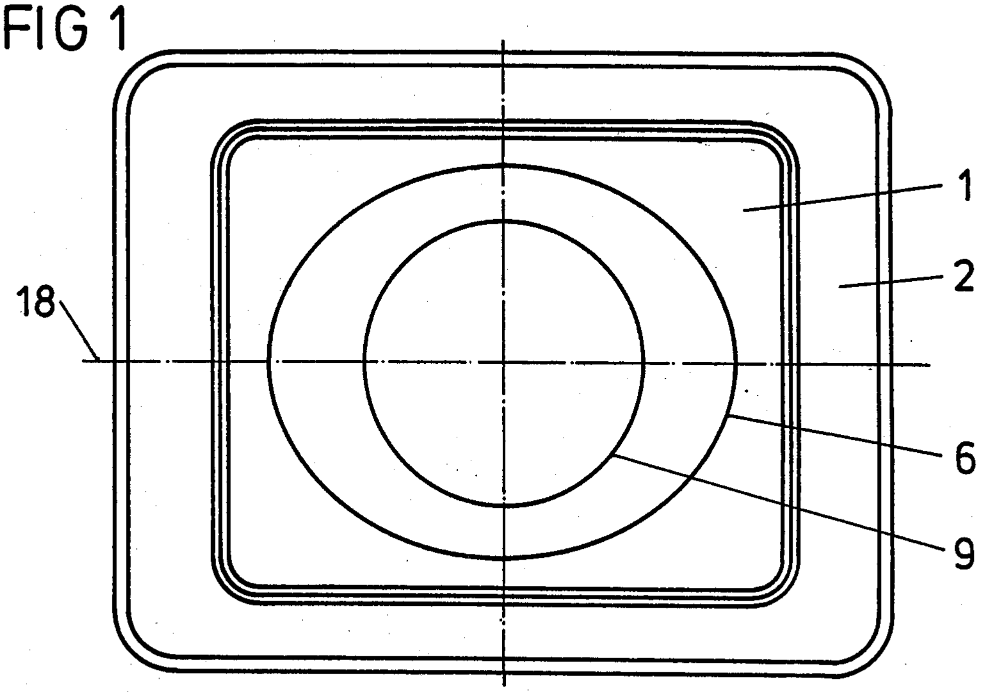

The invention concerns a screened vehicular headlight with an ellipsoidal reflector having a source of light positioned in the reflector's first focal area, with a collecting lens positioned in the path of the rays behind the second focal area and inserted into a flat area of a holder of the same dimensions as the lens and having its margin bent back toward the inside of the headlight and merging into supporting arms, their free ends secured to the outer edge of the reflector, with a screen positioned in the focal area of the collecting lens and between the lens and the reflector, the upper, essentially horizontal edge of the screen producing the light-dark border, and with a transparent cover over the collecting lens having margins extending radially beyond the lens.

A screened vehicular headlight of this type is known from German No. GM 8 430 630. To make it more rigid, the flat area of the holder that accommodates the collecting lens is surrounded by a margin that is bent back toward the inside of the headlight. The margin merges into supporting arms with free ends that are secured to the outer edge of the reflector. A screen is positioned at the focus of the collecting lens and secured to two of the supporting arms. The rays of light emerging from a headlight of this type travel directly out from the the source of light between the flat area of the holder and the outer surface of the headlight. The rays of light that are aimed upward dazzle not only oncoming drivers but also, due to reflection, the driver of the vehicle himself during fog, rain, or snow. Furthermore, the overall impression of the headlight is not very harmonious when it is turned off because an observer can see inside it between the collecting lens and the outer surface of the headlight.

A screened vehicular headlight with a collecting lens surrounded by a transparent cover that diverts into the desired direction the deviant rays emerging directly from the source of light is known from German No. OS 3 218 703. It turns out that the dazzling of the driver's eyes due to reflected deviant rays during fog, rain, or snow is not completely eliminated. The transparent cover around the collecting lens should, due to the high temperatures that occur in the collecting lens, be made out of a highly heat-resistant material. This makes the transparent lens cover very expensive to manufacture.

The object of the invention is to develop the screened vehicular lens cover as defined in the generic description to the extent that both the rays of light that arrive directly from the source of light, strike the marginal areas extending radially beyond the lens, and are aimed upward, and the view into the headlight through the marginal areas of the lens cover will be screened off without increasing manufacturing costs or aggravating assembly.

This object is attained in accordance with the invention by means of the design recited in the body of claim 1 for the holder that accommodates the collecting lens.

A headlight of this type exhibits when turned off a uniform appearance, because the rays of light that strike from outside the margin that is bent back toward the inside of the headlight are not reflected outward and do not produce a ring of light around the collecting lens, but are reflected back inside the headlight.

If the headlight is very flat, the upper marginal section of the holder can be bent in toward the inside of the headlight at an angle of 90° whereas, if it is taller, it is practical for the upper marginal section of the holder to extend out at an acute angle to the optical axis.

It is also practical for the flat area of the holder that accommodates the collecting lens to be rectangular and for the holder and the marginal sections of the rectangular area that are bent in toward the inside of the headlight or extend at an acute angle to the optical axis to be made out of one piece of sheet metal and for the marginal sections between two adjacent supporting arms to be cut free and bent outward. This solution is very simple and can be manufactured very inexpensively.

It is also practical for the surfaces of the holder that face the transparent lens cover to be reflecting. This makes a headlight that operates on the projection principle look very similar when turned off to a conventional headlight.

The invention is illustrated in the drawings, wherein

Figure 2:
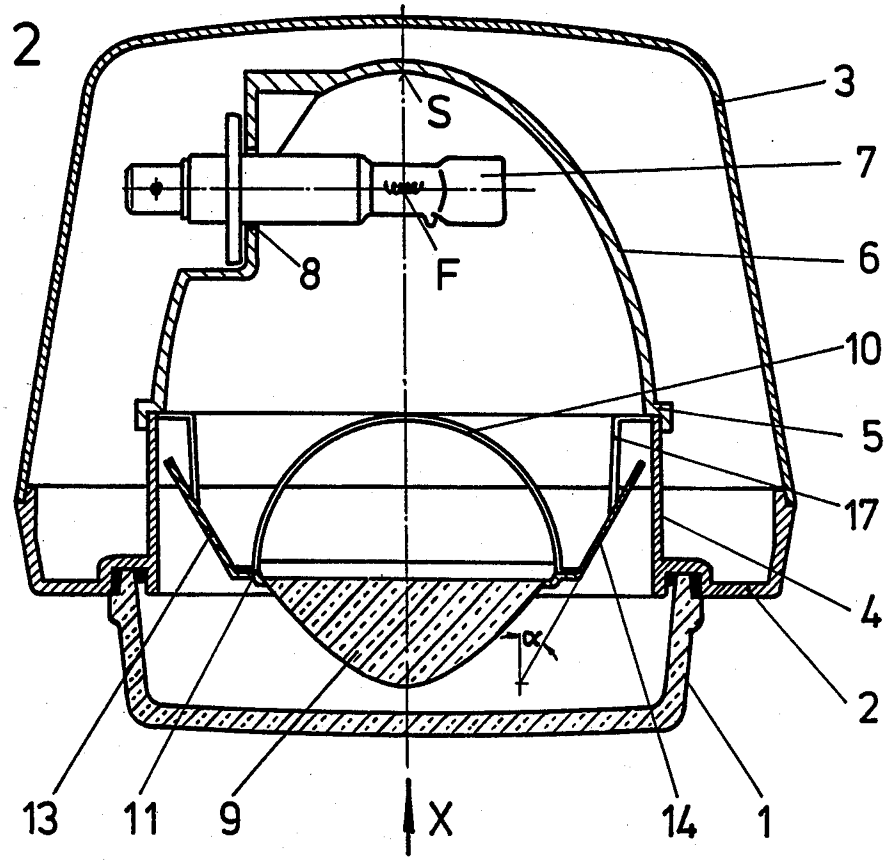
Figure 3:
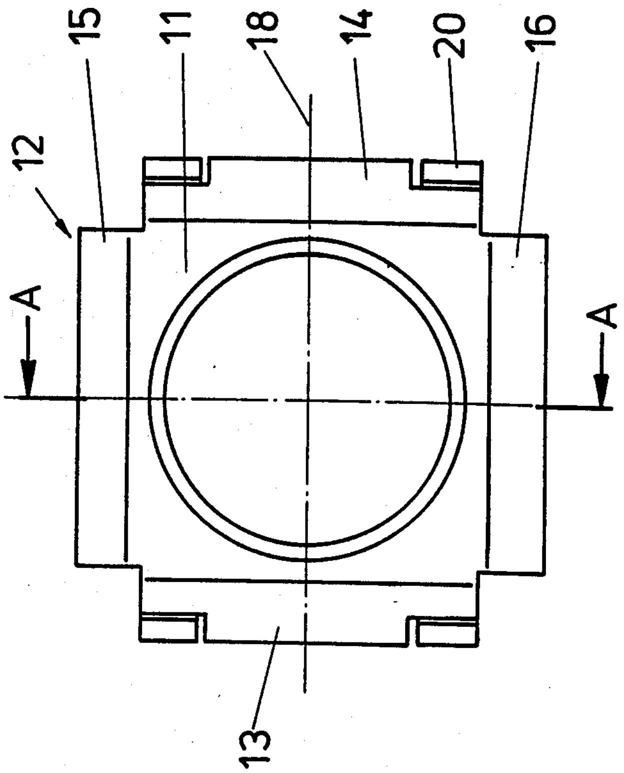
Figure 4:
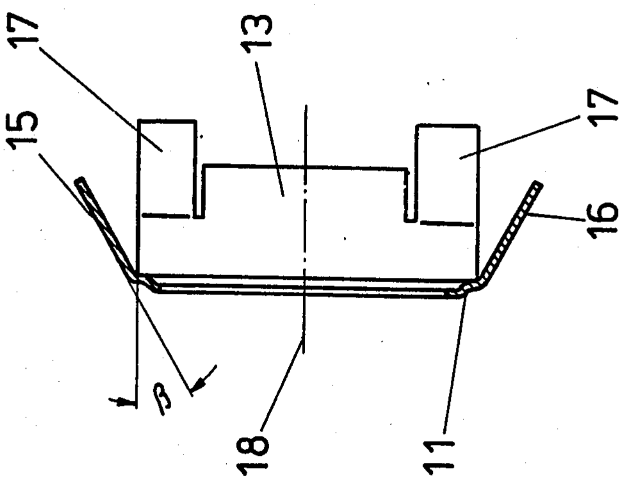

FIG. 1 is a front view of a screened vehicular headlight in accordance with the projection principle and with a rectangular transparent lens cover, FIG. 2 is a horizontal longitudinal section through the middle of a headlight with a collecting lens and screen accommodated in a holder secured to the edge of the reflector, FIG. 3 is a view along the direction X of the holder that accommodates the collecting lens and the screen, and FIG. 4 is a section through the holder along the line A—A.

The drawings show a vehicular headlight for fog. A rectangular transparent lens cover 1 is cemented all around the edge to a frame 2. Frame 2 is screwed (unillustrated) to the housing 3 of the headlight. Frame 2 has a bushing-shaped section 4 that extends into the headlight with its free end secured to an outer edge 5 that extends around a reflector 6. The interior reflecting surface of reflector 6 describes a semi-ellipse in each axial midsection. The vertex S and the associated inner focus F of the semi-ellipses coincide. The eccentricity of the ellipses increases from the vertical axial midsection to the horizontal axial midsection. Reflector 6 can also be a strict ellipsoid of rotation.

A bulb 7 is inserted in an opening 8 at one side of reflector 6 to keep the headlight as shallow as possible for purposes of installation. The filament of bulb 7 is positioned in the inner focus F of reflector 6 and extends across the optical axis. A collecting lens 9 and a screen 10, positioned in the focal area of the lens, are securely inserted in the annular flat area 11 of a holder 12 made out of sheet metal. The periphery of annular area 11 is rectangular and has a marginal section 13, 14, 15, and 16 bent in toward the inside of the headlight along each of its four edges. The lateral marginal sections 13 and 14 and the upper and lower marginal sections 15 and 16 are at an acute angle $\alpha$ or $\beta$ to the optical axis. At the corners of rectangular section 11 the marginal sections 13 and 14 that extend back inside of the head light merge into supporting arms 17 that parallel the optical axis and are secured by their bent-out free ends 20 to the outer edge 5 of the reflector 6. Marginal sections 13, 14, and 15 extend far enough into the headlight to screen off not only the light that leaves bulb 7 and directly strikes the marginal areas of lens cover 1 that extend radially beyond collecting lens 9 but also the view into the headlight through the marginal areas of lens cover 1. The sole function of lower marginal section 16 is to reinforce rectangular area 11.

I claim:

1. A screened vehicular headlight comprising: an ellipsoidal reflector with a first focal area and a second focal area; a source of light positioned in said first focal area; a collecting lens positioned in a light ray path behind said second focal area; a holder with a flat area having dimensions substantially identical to the dimensions of said lens, said lens being inserted into said flat area of said holder; said holder having a marginal portion bent back toward the inside of the headlight; supporting arms with free ends secured to an outer edge of said reflector, said marginal portion merging into said supporting arms; a screen positioned in the focal area of said collecting lens and between said lens and said reflector; said screen having an upper substantially horizontal edge producing a light-dark border; a transparent cover over said collecting lens and having margins extending radially beyond said lens; said holder having an upper marginal section above a horizontal midplane of said headlight, said upper marginal section being bent toward the inside of said headlight; said holder having also lateral marginal sections extending out at an acute angle to the optical axis of said lens, said lateral marginal sections extending into the headlight by an amount to screen off light leaving said source of light and striking directly marginal areas of said transparent cover, said marginal areas extending radially beyond said collecting lens, said lateral marginal sections screening off also views into the headlight through said marginal areas of said transparent cover, said transparent cover having an area substantially larger than the area of said collecting lens so that said cover has an area surrounding substantially the area of said lens; said holder preventing disturbing light from entering and leaving said headlight.

2. A screened vehicular headlight as defined in claim 1, wherein said upper marginal section of said holder extends out at a substantially acute angle to said optical axis.

3. A screened vehicular headlight as defined in claim 1, wherein said flat area holding the inserted lens in said holder has a substantially rectangular shape, said marginal portion of said rectangular shape being bent in toward the inside of said headlight and being made out of one piece of sheet metal.

4. A screened vehicular headlight as defined in claim 3, wherein said marginal portion comprises marginal sections bent in toward the inside of the headlight and extend at a substantially acute angle to said optical axis between two adjacent supporting arms, said marginal sections being cut free and bent outward.

5. A screened vehicular headlight as defined in claim 1, wherein said flat area holding the inserted lens in said holder having a rectangular shape, said marginal portion extending at a substantially acute angle to said optical axis and being made out of one piece of sheet metal.

6. A screened vehicular headlight as defined in claim 1, wherein surfaces of said holder facing said transparent cover are reflecting surfaces.

7. A screened vehicular headlight comprising: an ellipsoidal reflector with a first focal area and a second focal area; a source of light positioned in said first focal area; a collecting lens positioned in a light ray path behind said second focal area; a holder with a flat area having dimensions substantially identical to the dimensions of said lens, said lens being inserted into said flat area of said holder; said holder having a marginal portion bent back toward the inside of the headlight; supporting arms with free ends secured to an outer edge of said reflector, said marginal portion merging into said supporting arms; a screen positioned in the focal area of said collecting lens and between said lens and said reflector; said screen having an upper substantially horizontal edge producing a light-dark border; a transparent cover over said collecting lens and having margins extending radially beyond said lens; said holder having an upper marginal section above a horizontal midplane of said headlight, said upper marginal section being bent toward the inside of said headlight; said holder having also lateral marginal sections extending out at an acute angle to the optical axis of said lens, said lateral marginal sections extending into the headlight by an amount to screen off light leaving said source of light and striking directly marginal areas of said transparent cover, said marginal areas extending radially beyond said collecting lens, said lateral marginal sections screening off also views into the headlight through said marginal areas of said transparent cover, said transparent cover having an area substantially larger than the area of said collecting lens so that said cover has an area surrounding substantially the area of said lens; said holder preventing disturbing light from entering and leaving said headlight; said flat area holding said collecting lens in said holder having a rectangular shape, said marginal portion comprising marginal sections of said rectangular shape and being bent in toward the inside of said headlight and extending at a substantially acute angle to said optical axis, said marginal sections being made out of one piece of sheet metal.

8. A screened vehicular headlight comprising: an ellipsoidal reflector with a first focal area and a second focal area; a source of light positioned in said first focal area; a collecting lens positioned in a light ray path behind said second focal area; a holder with a flat area having dimensions substantially identical to the dimensions of said lens, said lens being inserted into said flat area of said holder; said holder having a marginal portion bent back toward the inside of the headlight; supporting arms with free ends secured to an outer edge of said reflector, said marginal portion merging into said supporting arms; a screen positioned in the focal area of said collecting lens and between said lens and said reflector; said screen having an upper substantially horizontal edge producing a light-dark border; a transparent cover over said collecting lens and having margins extending radially beyond said lens; said holder having an upper marginal section above a horizontal midplane of said headlight, said upper marginal section being bent toward the inside of said headlight; said holder having also lateral marginal sections extending out at an acute angle to the optical axis of said lens, said lateral marginal sections extending into the headlight by an amount to screen off light leaving said source of light and striking directly marginal areas of said transparent cover, said marginal areas extending radially beyond said collecting lens, said lateral marginal sections screening off also views into the headlight through said marginal areas of said transparent cover, said transparent cover having an area substantially larger than the area of said collecting lens so that said cover has an area surrounding substantially the area of said lens; said holder preventing disturbing light from entering and leaving said headlight; said upper marginal section of said holder extending out at a substantially acute angle to said optical axis; said flat area for holding said collecting lens in said holder having a rectangular shape, said marginal portion comprising marginal sections of said rectangular shape and being bent in toward the inside of the headlight and extending at substantially acute angle to said optical axis, said marginal sections being made out of one piece of sheet metal; said marginal sections being positioned between two adjacent supporting arms and being cut free and bent outward; surfaces of said holder facing said transparent cover comprising reflecting surfaces.

* * * * *